United States Patent
Jungert et al.

(10) Patent No.: US 8,348,335 B2
(45) Date of Patent: Jan. 8, 2013

(54) CONVERTIBLE VEHICLE

(75) Inventors: Dieter Jungert, Weissach (DE); Juergen Ochs, Moensheim (DE); Rainer Joest, Vaihingen an der Enz (DE)

(73) Assignee: Dr. Ing. h.c.f. Porsche Aktiengesellschaft (DE)

( * ) Notice: Subject to any disclaimer, the term of this patent is extended or adjusted under 35 U.S.C. 154(b) by 48 days.

(21) Appl. No.: 12/809,926

(22) PCT Filed: Nov. 14, 2008

(86) PCT No.: PCT/EP2008/009634
§ 371 (c)(1),
(2), (4) Date: Jun. 21, 2010

(87) PCT Pub. No.: WO2009/095049
PCT Pub. Date: Aug. 6, 2009

(65) Prior Publication Data
US 2010/0276958 A1 Nov. 4, 2010

(30) Foreign Application Priority Data
Jan. 30, 2008 (DE) .......................... 10 2008 006 608

(51) Int. Cl.
*B62D 25/14* (2006.01)
(52) U.S. Cl. .................................................. 296/193.02
(58) Field of Classification Search ............. 296/193.02, 296/193.06, 193.07, 70, 71, 72, 29, 35.1
See application file for complete search history.

(56) References Cited

U.S. PATENT DOCUMENTS

| 2,549,925 | A | * | 4/1951 | Paton .............................. 74/493 |
| 2,741,324 | A | * | 4/1956 | Anderson ........................ 180/90 |
| 3,789,945 | A | * | 2/1974 | Hansen ......................... 180/69.2 |
| 3,918,541 | A | * | 11/1975 | Krieger ....................... 180/69.22 |
| 4,826,234 | A | | 5/1989 | Komatsu |
| 5,114,182 | A | | 5/1992 | Thull et al. |
| 6,851,742 | B1 | * | 2/2005 | Kubiak .................... 296/193.02 |
| 8,016,342 | B2 | * | 9/2011 | Durocher ........................ 296/72 |
| 2006/0017310 | A1 | * | 1/2006 | Joo et al. ................... 296/193.02 |
| 2008/0122260 | A1 | | 5/2008 | Meier |

FOREIGN PATENT DOCUMENTS

| DE | 34 19 002 | 11/1985 |
| DE | 197 28 557 | 1/1998 |
| DE | 198 43 211 | 3/1999 |
| EP | 0 440 898 | 8/1991 |
| EP | 0 589 299 | 3/1994 |
| EP | 1 925 535 | 5/2008 |
| FR | 1395347 | 4/1965 |
| FR | 2 891 799 | 4/2007 |
| JP | 6367378 | 5/1988 |
| JP | 63114765 | 7/1988 |
| JP | 3048356 | 6/2000 |
| JP | 2002053070 | 2/2002 |
| JP | 2004-314813 | 11/2004 |
| WO | 01/17842 | 3/2001 |

* cited by examiner

*Primary Examiner* — H Gutman
(74) *Attorney, Agent, or Firm* — Gerald E. Hespos; Michael J. Porco

(57) ABSTRACT

A passenger car configured as a convertible, with an underbody, which has a middle tunnel, and with a cockpit carrier, on which a steering column carrying a steering handwheel is mounted. Driving comfort can be increased if the cockpit carrier is attached solely to the middle tunnel fixedly in three directions perpendicular to one another.

17 Claims, 4 Drawing Sheets

CONVERTIBLE VEHICLE

CROSS-REFERENCE TO RELATED APPLICATIONS

This application is the U.S. national phase of PCT/EP2008/009634, which claims priority on German Patent Appl. No. 10 2008 006 608.7, the disclosures of which are incorporated in their entirety.

BACKGROUND OF THE INVENTION

1. Field of the Invention

The present invention relates to a passenger car configured as a convertible.

2. Description of the Related Art

In motor vehicles, torsional vibrations may occur about a longitudinal axis of the vehicle during operation, for example when the vehicle is traveling on an uneven road. In convertible vehicles, these torsional vibrations arise to a greater extent, since, because of the absence of a roof, the neutral axis or nodal line of the vibrations lies at a comparatively low level and is to be found, for example, in the region of an underbody of the vehicle. The result of this is that deflections triggered by the torsional vibrations are the greater, the further away the corresponding region of the vehicle is from the underbody. For example, the absolute deflection due to the torsional vibrations is correspondingly lower at the bottom of the A-column than at the top of the A-column. Torsional vibrations of this kind, which are also designated as "convertible jitter", lead to a loss of comfort. The vehicle driver can perceive this jitter visually, for example, on the interior mirror or by touch on the steering wheel. The frequency of the torsional vibrations is dependent particularly on the vehicle speed, since they are excited via the chassis.

EP 0 589 299 discloses a link arrangement for a motor vehicle, said link arrangement having a mounting which is connected fixedly to a front part of the motor vehicle and on which are provided pivotably arranged supporting elements which can be subjected to tensile and/or compressive stress and are connected to the body.

EP 0 440 898 relates to an elastic tie-up of a steering system to a middle tunnel of the motor vehicle.

DE 34 19 002 describes a stiffening of a vehicle body.

DE 198 43 211 relates to a rigid tie-up of a steering column of a vehicle to a supporting frame. DE 199 26 636 relates to a variably insertable cockpit crossmember in a motor vehicle.

WO 01/17842 relates to a reinforcing part for an instrument carrier, said reinforcing part being configured as an H-profile.

The present invention is concerned with the problem of specifying for a passenger car of the type initially mentioned an improved embodiment which is distinguished particularly in that the effects of the torsional vibrations are noticed less markedly by the driver, thus leading to an increase in comfort.

SUMMARY OF THE INVENTION

The invention is based on the general idea of fixedly connecting a cockpit carrier, on which a steering column carrying a steering handwheel is attached, to a middle tunnel of an underbody of the vehicle. Since the neutral line or axis of rotation of the torsional vibrations runs essentially in the region of the middle tunnel, the middle tunnel itself is scarcely excited by the torsional vibrations. The invention makes use of this recognized fact. To be precise, the scarcely excited middle tunnel can in itself transmit vibrations only insignificantly to the components fixedly connected to it. The supporting frame fixedly connected to it and also the steering column tied to it are consequently excited only slightly by torsional vibrations. The jitter on the steering handwheel which disturbs comfort can thereby be reduced.

In a first solution, the tie-up of the cockpit crossmember takes place solely on the middle tunnel, specifically such that the cockpit crossmember is fastened fixedly to the middle tunnel in three directions perpendicular to one another. These three directions define a Cartesian coordinate system, in a vehicle the X-axis or X-direction usually being formed by the vehicle longitudinal direction, the Y-axis or Y-direction being formed by a vehicle transverse axis, and the Z-axis or Z-direction being formed by a vertical upward axis. In this first solution, the support of the steering column via the cockpit carrier takes place solely on the middle tunnel, with the result that the steering column and therefore the steering handwheel are decoupled from movements of other vehicle components which are triggered by the torsional vibrations.

In a second solution, the cockpit carrier, in addition to being tied up to the middle tunnel fixedly in the three axes, is, moreover, attached at least to one of the A-columns of the vehicle pliably in the vehicle transverse direction, that is to say in the Y-axis, while the cockpit carrier is attached fixedly to the A-column in the other two directions, that is to say in the X-axis and in the Z-axis. This solution is based on the recognition that the deflections of the vehicle parts which are excited by the torsional vibrations have their greatest component in the vehicle transverse direction. As a result of the pliable tie-up in the vehicle transverse direction, the A-column can execute movements in the vehicle transverse direction in relation to the cockpit carrier, so that only a reduced transmission of vibrations occurs here. In the present context, a "pliable tie-up" is understood to mean a tie-up which permits elastic, in particular spring-elastic, relative movements between the components connected pliably to one another, at least to a greater extent than a rigid or fixed tie-up. A pliable tie-up of this type may be implemented, for example, by means of elastomeric coupling members.

According to an especially advantageous development of the second solution, the cockpit carrier may be configured as a cockpit crossmember which is then attached to the two A-columns pliably in the vehicle transverse direction and fixedly in the other two directions. The additional tie-up of the cockpit carrier to one A-column or to two A-columns increases the stability of the crossmember, can be utilized for stiffening the body and increases vehicle safety.

A development is especially advantageous in which the cockpit carrier or the cockpit crossmember is attached to a scuttle frame, connecting the two A-columns fixedly to one another in their middle region, pliably in the vehicle transverse direction and fixedly in the other two directions. By virtue of this type of construction, the cockpit carrier is additionally supported on the scuttle frame, this, in turn, increasing the stability of the body and therefore vehicle safety. Here too, however, because the tie-up is pliable in the Y-axis, decoupling in respect of the excitation of vibrations is achieved, in order to reduce the transmission of vibrations acting in the Y-direction from the scuttle frame to the cockpit carrier and therefore via the steering column to the steering handwheel.

In a third solution, the cockpit carrier, in addition to being tied up to the middle tunnel fixedly in the three axes, is, moreover, tied up at least to one of the A-columns of the vehicle, in a lower region, likewise fixedly in the three axes. This solution is based on the knowledge that the torsional vibrations in the lower region of the A-column have only comparatively low amplitudes, so that the transmission of torsional vibrations to the cockpit carrier can be significantly reduced if it is tied up to the respective A-column solely in the lower region.

Further important features and advantages of the invention will be gathered from the subclaims, from the drawings and from the accompanying figure description with reference to the drawings.

It will be appreciated that the features mentioned above and those yet to be explained below can be used not only in the combination specified in each case, but also in other combinations or alone, without departing from the scope of the present invention.

Preferred exemplary embodiments of the invention are illustrated in the drawings and are explained in more detail in the following description, the same reference symbols referring to identical or similar or functionally identical components.

DETAILED DESCRIPTION OF THE PREFERRED EMBODIMENTS

Figure 1:
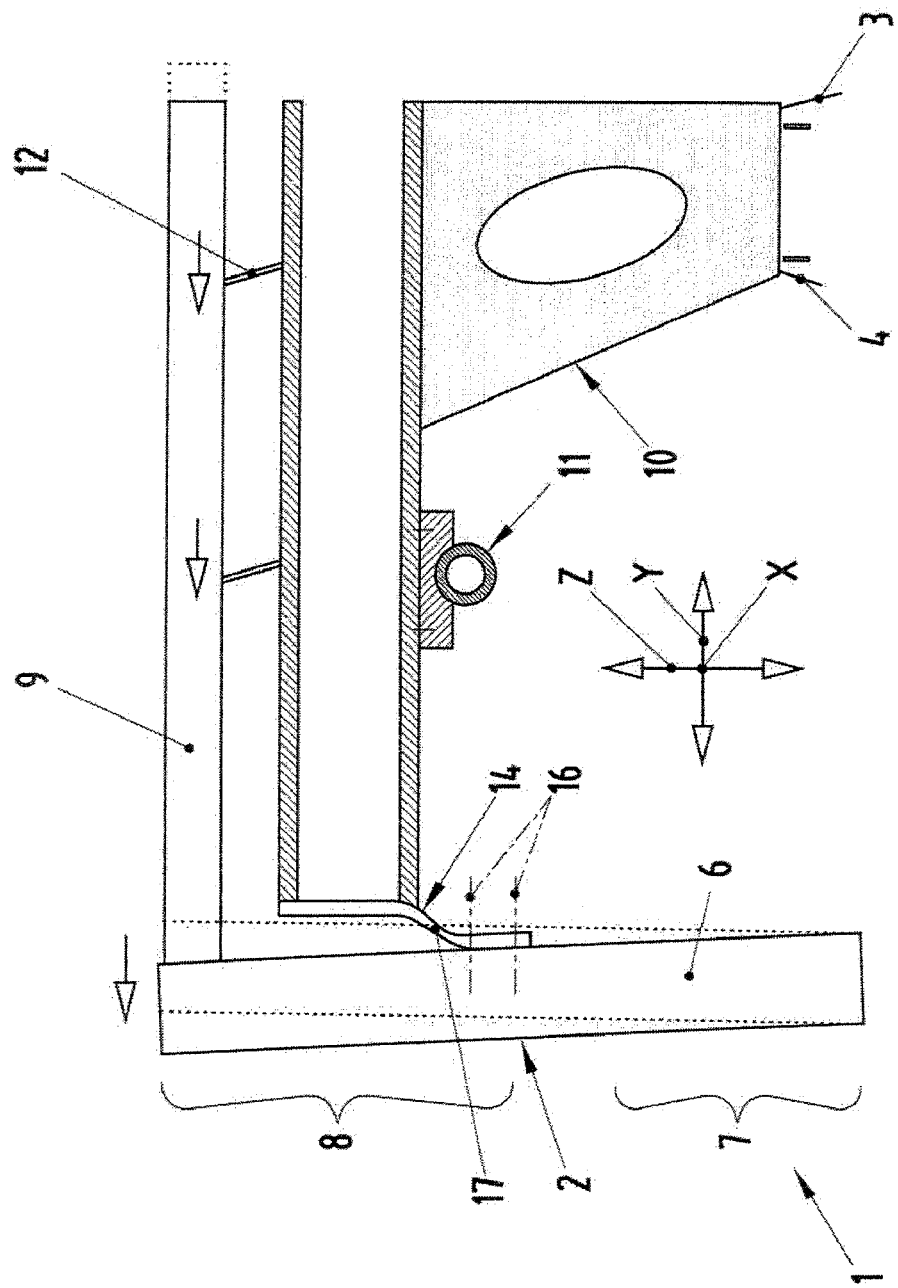
FIGS. 1 to 4 shows greatly simplified views of a passenger car from inside, in the region of a cockpit carrier of a vehicle body, in various embodiments.

According to FIGS. 1 to 4, a vehicle 1, of which only part of a body 2 in the region of a front dashboard or splashboard, not shown, is illustrated, comprises an underbody 3, of which only part of a middle tunnel 4 can be seen here. The vehicle 1 is expediently configured as a convertible, that is to say possesses a removable or swing-open or fold-open roof, soft top or hard top. The middle tunnel 4 extends in a vehicle longitudinal direction X which is perpendicular to the drawing plane. A vehicle transverse direction Y extends perpendicularly with respect to the vehicle longitudinal direction X and is indicated here by a double arrow. Furthermore, here, a double arrow indicates a vehicle upward axis Z which runs perpendicularly with respect to the longitudinal axis X and perpendicularly with respect to the transverse axis Y. The three directions running perpendicularly with respect to one another define a Cartesian coordinate system of the vehicle 1.

In the region of the dashboard 2, in each case an A-column 6, of which in each case only one is illustrated, extends from the underbody 3 on each vehicle side. The respective A-column 6 is fixedly connected in its lower region 7 to the underbody 3. The two A-columns 6 are connected fixedly to one another in their middle region 8 via a scuttle frame 9. In their upper region, not illustrated, the A-columns 6 form a lateral border of a windshield of the vehicle 1.

Moreover, the vehicle 1 is equipped with a cockpit carrier 10 which serves for carrying a steering column 11. The steering column 11 held by the cockpit carrier 10 carries, in turn, a steering handwheel, not illustrated here, via which the respective vehicle driver can introduce steering commands into a steering system of the vehicle 1. The steering column 11 is illustrated only partially here. In particular, the steering column 11 pierces the dashboard.

According to a first solution, not shown here, the cockpit carrier 10 is fastened solely to the middle tunnel 4, specifically such that it is attached fixedly to the middle tunnel 4 in all three spatial directions X, Y, Z. The tie-up takes place, for example, by means of correspondingly rigid screw connections and/or by means of weld spots. In this embodiment, not shown, the cockpit carrier 10 is virtually self-supporting.

Since the middle tunnel 4 is scarcely excited by torsional vibrations of the vehicle, the middle tunnel 4 can also scarcely transmit vibrations to the cockpit carrier 10. Accordingly, the steering column 11 and therefore the steering handwheel attached to it remain largely protected from torsional vibrations.

Figure 2:
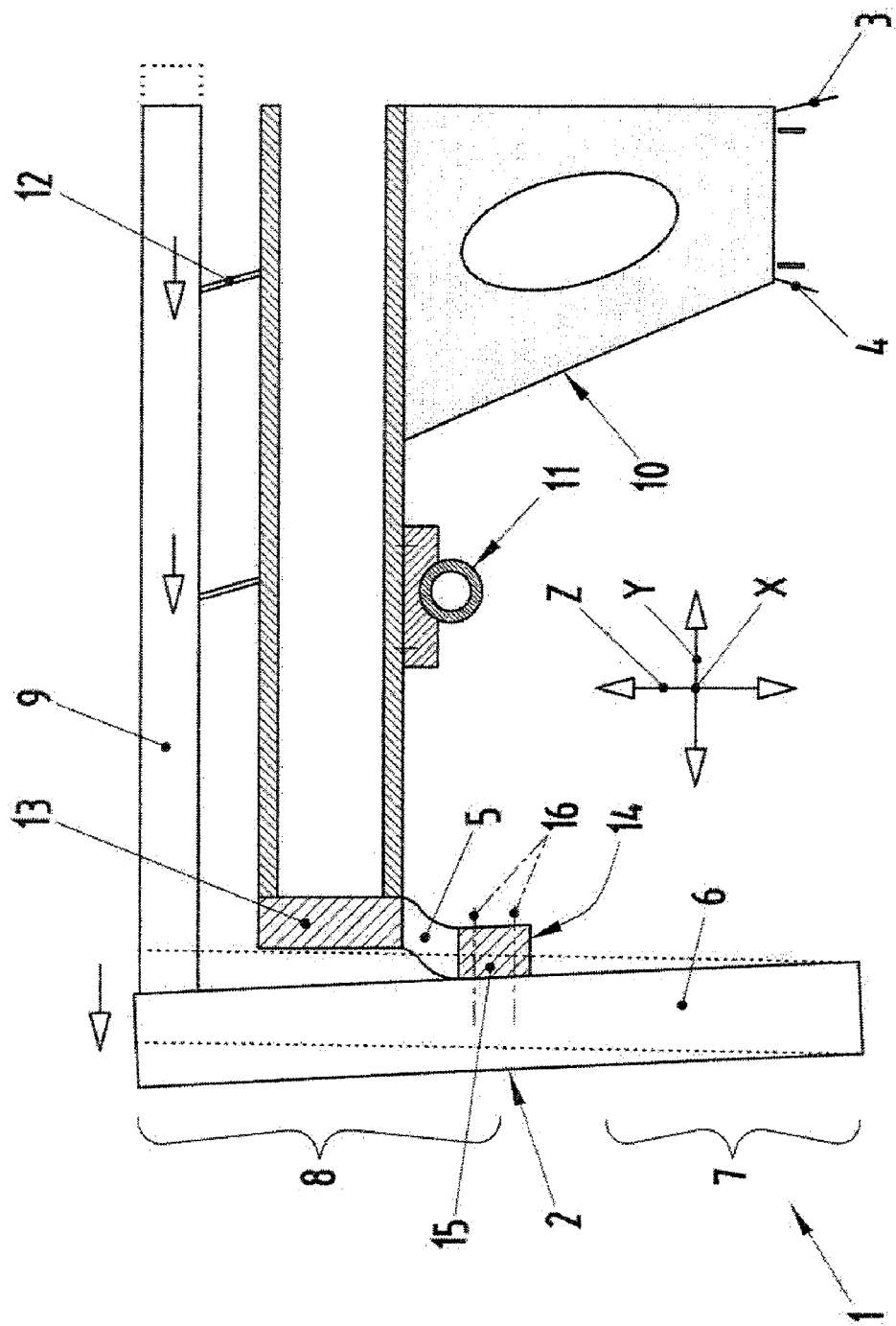
Figure 3:
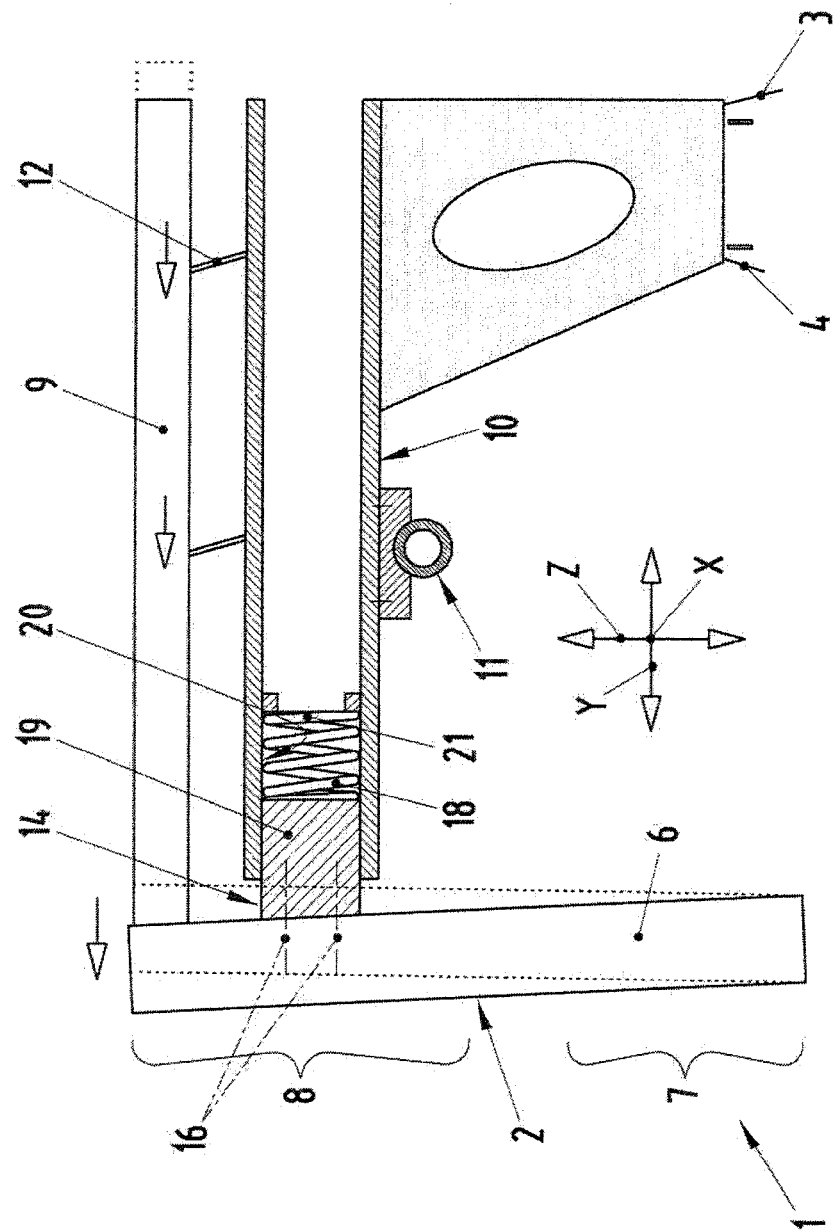

In the solutions shown in FIGS. 1 to 4, moreover, the cockpit carrier 10 is attached to at least one of the A-columns 6, preferably to the driver-side A-column 6, specifically such that it is attached to the A-column 6 pliably in the vehicle transverse direction Y, while it is attached to the A-column 6 fixedly in the vehicle longitudinal direction X and in the upward axis Z. FIGS. 1 to 4 thus in each case show embodiments in which the cockpit carrier 10, in addition to being tied up fixedly to the middle tunnel 4, is fastened only to one of the two A-columns 6, to be precise to the driver-side A-column 6, in the way described. In the embodiments of FIGS. 1 to 3, the tie-up of the cockpit carrier 10 to the A-column 6 takes place in the middle region 8 of the A-column 6. In the embodiment shown in FIG. 4, the tie-up of the cockpit carrier 10 to the A-column 6 takes place in the lower region 7 of the A-column 6.

Owing to the Y-pliable tie-up of the cockpit carrier 10 to the respective A-column 6, vibrations of the A-column 6 which are propagated in the A-column 6 on account of torsional vibrations of the vehicle 1 can be transmitted, only reduced in the Y-direction, to the cockpit carrier 10. Since the main component of the torsional vibrations runs in the Y-direction, this gives rise to a considerable reduction in the transmission of torsional vibrations between the A-column 6 and cockpit carrier 10. The cockpit carrier 10 is to some extent decoupled from the torsional vibrations of the A-column 6 due to the tie-up which is pliable in the Y-direction. The torsional vibrations can therefore be detected only to a reduced extent on the steering column 11 and on the steering handwheel.

Alternatively, in other embodiments, the cockpit carrier 10 may be attached to both A-columns 6 in the way described, to be precise pliably in the vehicle transverse direction Y and fixedly in the vehicle longitudinal direction X and in the vehicle upward direction Z. In such a type of construction, the cockpit carrier 10 is configured as a cockpit crossmember which is supported on both A-columns 6.

In the embodiments of FIGS. 1 to 4, the cockpit carrier 10 or cockpit crossmember is additionally attached to the scuttle frame 9. For this purpose, the cockpit carrier 10 has a bracket 12 in order to implement a corresponding tie-up. The tie-up between the cockpit carrier 10 and scuttle frame 9 in this case takes place such that the cockpit carrier 10 is attached to the scuttle frame 9 pliably in the Y-direction and fixedly in the X-direction and in the Z-direction. Correspondingly, here too, the transmission of vibrations, running parallel to the vehicle transverse direction Y, between the scuttle frame 9 and cockpit carrier 10 is consequently reduced, so that even torsional vibrations in the scuttle frame 9 cannot be transmitted or can be transmitted to only a diminished extent to the cockpit carrier 10 and therefore to the steering column 11 and ultimately to the steering handwheel.

In another embodiment, not shown here, there may additionally be provision, as an option, for additionally attaching the cockpit carrier 10 to the underbody 3 fixedly in all three directions X, Y, Z, specifically in a region, not shown here, of the underbody 3 which is distanced from the middle tunnel 4 that is located on a vehicle side assigned to the steering column 11, that is to say on the driver side. In said region, moreover, the tie-up of the low region 7 of the driver-side A-column 6 to the underbody 3 is to be found. In this region of the underbody 3, the torsional vibrations are still comparatively low, so that vibrations causing scarcely any disturbance are transmitted into the cockpit carrier 10 here. This optionally provided additional support of the cockpit carrier 10 can improve the rigidity of the vehicle body in the region of the dashboard 2.

According to FIGS. 1 to 4, a connecting member 14 may be provided for implementing the Y-pliable tie-up between the cockpit carrier 10 and the respective A-column 6. This connecting member 14 is configured so that it has a lower rigidity in the Y-direction than in the X-direction and in the Z-direction. This connecting member 14 may, for example, have a latticework-like structure which here may comprise a plurality of webs 15 which together form the latticework structure. These webs may in this case be oriented and dimensioned so that the latticework structure possesses higher elasticity in the Y-direction than in the other two directions X and Z. For this purpose, the webs may, for example, have a comparatively wide dimensioning in the X-direction and be inclined relatively sharply to perpendicularly with respect to the Y-direction. The latticework-like connecting member 14 may, for example, be an extruded profile which may be produced, in particular, from a light metal or from a light metal alloy with aluminum and/or magnesium.

Expediently the tie-up of the cockpit carrier 10 to the respect A-column 6 takes place relatively far down, for example at a lower end of the middle region 8 of the respective A-column 6. The result of this is that the amplitudes, dependent on the distance from the underbody 3, of the vibrations active in the Y-direction are lower within the A-column 6, thus likewise leading to a reduction in the torsional vibrations in the cockpit carrier 10. This downward-drawn tie-up can be implemented particularly simply with the aid of the connecting member 14. The tie-up points shown here, indicated by two dashed and dotted lines 16, are offset downward in the Z-direction, while the support of the connecting member 14 on the cockpit carrier 10 is offset upward.

Figure 4:
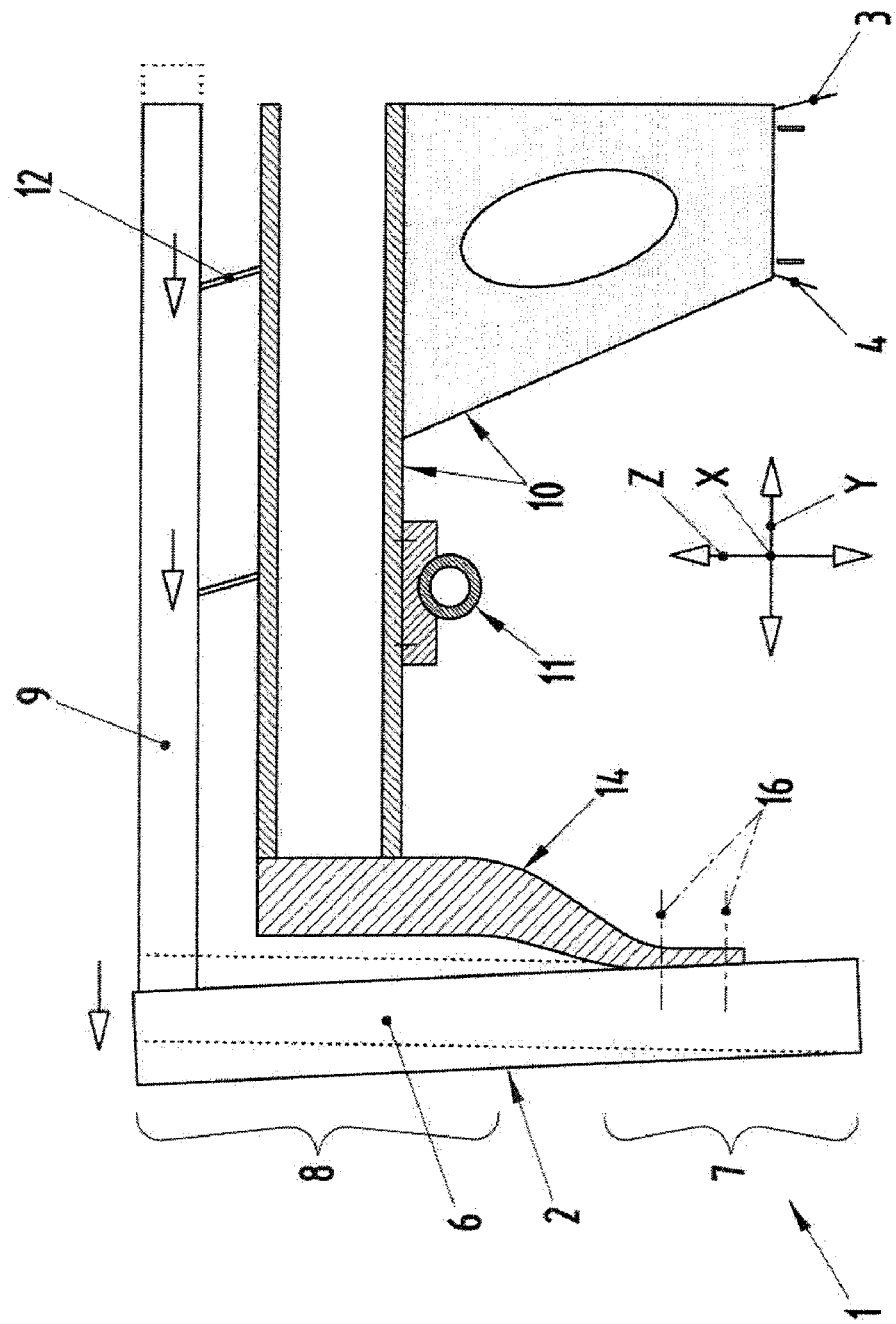

In the embodiments shown in FIGS. 1 and 4, the connecting member 14 is configured as a leaf spring 17 which is spring-elastically resilient in the vehicle transverse direction Y. As a result of this type of construction, the transmission of vibrations in the Y-direction between the A-column 6 and cockpit carrier 10 can be reduced especially effectively.

In the embodiment shown in FIG. 2, the connecting member 14 has comparatively rigid tie-up portions 13 and 15 and an elastic portion 5 connecting the two tie-up portions 13, 15 to one another. One tie-up portion 13 allows a fixed tie-up of the connecting member 14 to the cockpit carrier 10, while the other tie-up portion 15 allows a fixed tie-up to the A-column 6. The elastic portion 5 may be of spring-like configuration and makes it possible to have a spring-elastic coupling of the two tie-up portions 13, 15 to one another, in such a way that they are movable spring-elastically in relation to one another in the vehicle transverse direction Y, whereas they are coupled comparatively rigidly to one another in the Z-direction and in the X-direction.

FIG. 4 shows, on the one hand, the variant in which the cockpit carrier 10 is tied up in the lower region 7 of the A-column 6 via the connecting member 14, thus additionally reducing the transmission of vibrations. Correspondingly, in this embodiment, the connecting member 14 may be configured, overall, to be relatively rigid. The tie-up of the cockpit carrier 10 to the A-column 6 takes place here solely in the lower region 7, so that a tie-up pliable in the Y-direction may basically be dispensed with. Correspondingly, the embodiment according to FIG. 3 shows a tie-up of the cockpit carrier 10 to the A-column 6 which is fixed in the X-direction, in the Y-direction and in the Z-direction.

FIG. 3 shows, moreover, an embodiment in which the cockpit carrier 10 is attached to the A-column 6 via a spring device 18. This spring device 18 is spring-elastically resilient in the vehicle transverse direction Y and thereby likewise implements a motional decoupling between the A-column 6 and the cockpit carrier 10. In particular, the spring device 18 can be combined with the abovementioned connecting member 14 which possesses a latticework-like structure. The cockpit carrier 10 may likewise be coupled directly to the respective A-column 6 via the spring device 18, as shown in FIG. 3.

According to the exemplary embodiment shown here in FIG. 3, the spring device 18 may be configured in the manner of a piston/cylinder arrangement and correspondingly have a piston 19 which is mounted in a cylinder 20 so as to have an adjustable stroke in the vehicle transverse direction Y. Furthermore, a restoring spring 21 is provided, counter to which the piston 19 moves into the cylinder 20. In the example shown here, the piston 19 is arranged on the A-column 6 or on the connecting member 14, while the cylinder 20 is formed in the cockpit carrier 10. It is clear that a reverse arrangement can also be implemented.

The invention claimed is:

1. A passenger car configured as a convertible, comprising:
an underbody, which has a middle tunnel,
A-columns on opposite respective sides of the passenger car,
a cockpit carrier attached solely in a lower region of at least the A-column on the side of the passenger car on which a steering column carrying a steering handwheel is mounted,
the cockpit carrier further being attached to the middle tunnel fixedly in three directions perpendicular to one another, wherein a tie-up of the cockpit carrier to the respective A-column takes place via a connecting member that has a lower rigidity in a vehicle transverse direction than in other directions perpendicular to the vehicle transverse direction.

2. The passenger car of claim 1, wherein that the cockpit carrier is attached to the respective A-column in the lower region of the A-column fixedly in the three directions perpendicular to one another.

3. The passenger car of claim 1, wherein the cockpit carrier is a cockpit crossmember and is attached to both of the A-columns pliably in the vehicle transverse direction and fixedly in directions perpendicular to the vehicle transverse direction.

4. The passenger car of claim 1, wherein the passenger car has a scuttle frame connecting the two A-columns fixedly to one another in middle regions of the A-columns, the cockpit carrier being attached pliably to the scuttle frame in a vehicle transverse direction and fixedly in directions perpendicular to the vehicle transverse direction.

5. The passenger car of claim 1, wherein the cockpit carrier additionally is attached to the underbody on the side of the passenger car assigned to the steering column and in a region of the underbody distant from the middle tunnel, the attachment of the cockpit carrier to the underbody being fixed in the vehicle transverse direction and in directions perpendicular to the vehicle transverse direction.

6. The passenger car of claim 1, wherein the respective connecting member has a latticework-like structure that possesses higher elasticity in the vehicle transverse direction than in the directions perpendicular to the vehicle transverse direction.

7. The passenger car of claim 1, wherein the respective connecting member is configured as extruded profile.

8. The passenger car of claim 1, wherein the connecting member is a leaf spring that is spring-elastically resilient in the vehicle transverse direction.

9. A passenger car configured as a convertible, comprising:
- an underbody, which has a middle tunnel,
- A-columns on opposite respective sides of the passenger car,
- a cockpit carrier attached in a middle region of at least the A-column on the side of the passenger car on which a steering column carrying a steering handwheel is mounted,
- the cockpit carrier further being attached to the middle tunnel fixedly in three directions perpendicular to one another, and
- the cockpit carrier being attached at least to one A-column pliably in a vehicle transverse direction and fixedly in other directions perpendicular to the vehicle transverse direction,
- wherein a tie-up of the cockpit carrier to the respective A-column takes place via a connecting member that has a lower rigidity in the vehicle transverse direction than in directions perpendicular to the vehicle transverse direction.

10. The passenger car of claim 9, wherein a tie-up of the cockpit carrier to the respective A-column takes place at a lower end of the middle region.

11. A passenger car of configured as a convertible, comprising:
- an underbody, which has a middle tunnel,
- A-columns on opposite respective sides of the passenger car,
- a cockpit carrier attached solely in a lower region of at least the A-column on the side of the passenger car on which a steering column carrying a steering handwheel is mounted,
- the cockpit carrier further being attached to the middle tunnel fixedly in three directions perpendicular to one another, wherein the cockpit carrier is attached to the respective A-column directly or indirectly via a spring device that is spring-elastically resilient in a vehicle transverse direction.

12. The passenger car of claim 11, the spring device is a piston and cylinder arrangement with the piston arranged to be adjustable in the cylinder in the vehicle transverse direction counter to a restoring spring.

13. A passenger car configured as a convertible, comprising:
- an underbody, which has a middle tunnel,
- A-columns on opposite respective sides of the passenger car,
- a cockpit carrier attached in a middle region of at least the A-column on the side of the passenger car on which a steering column carrying a steering handwheel is mounted,
- the cockpit carrier further being attached to the middle tunnel fixedly in three directions perpendicular to one another, and
- the cockpit carrier being attached at least to one A-column pliably in a vehicle transverse direction and fixedly in other directions perpendicular to the vehicle transverse direction, wherein the cockpit carrier is attached to the respective A-column directly or indirectly via a spring device that is spring-elastically resilient in the vehicle transverse direction.

14. The passenger car claim 13, wherein the cockpit carrier is a cockpit crossmember and is attached to both A-columns pliably in a vehicle transverse direction and fixedly in directions perpendicular to the vehicle transverse direction.

15. The passenger car of claim 13, wherein the passenger car has a scuttle frame connecting the two A-columns fixedly to one another in middle regions of the A-columns, the cockpit carrier being attached pliably to the scuttle frame in a vehicle transverse direction and fixedly in directions perpendicular to the vehicle transverse direction.

16. The passenger car of claim 13, wherein the cockpit carrier additionally is attached to the underbody on the side of the passenger car assigned to the steering column and in a region of the underbody distant from the middle tunnel, the attachment of the cockpit carrier to the underbody being fixed in the vehicle transverse direction and in directions perpendicular to the vehicle transverse direction.

17. The passenger car of claim 13, the spring device is a piston and cylinder arrangement with the piston arranged to be adjustable in the cylinder in the vehicle transverse direction counter to a restoring spring.

* * * * *